Feb. 28, 1939.  J. W. GUINN  2,148,692
ARTICULATOR
Original Filed July 15, 1933    7 Sheets-Sheet 1

J. W. Guinn  INVENTOR.

Feb. 28, 1939.   J. W. GUINN   2,148,692
ARTICULATOR
Original Filed July 15, 1933    7 Sheets-Sheet 2
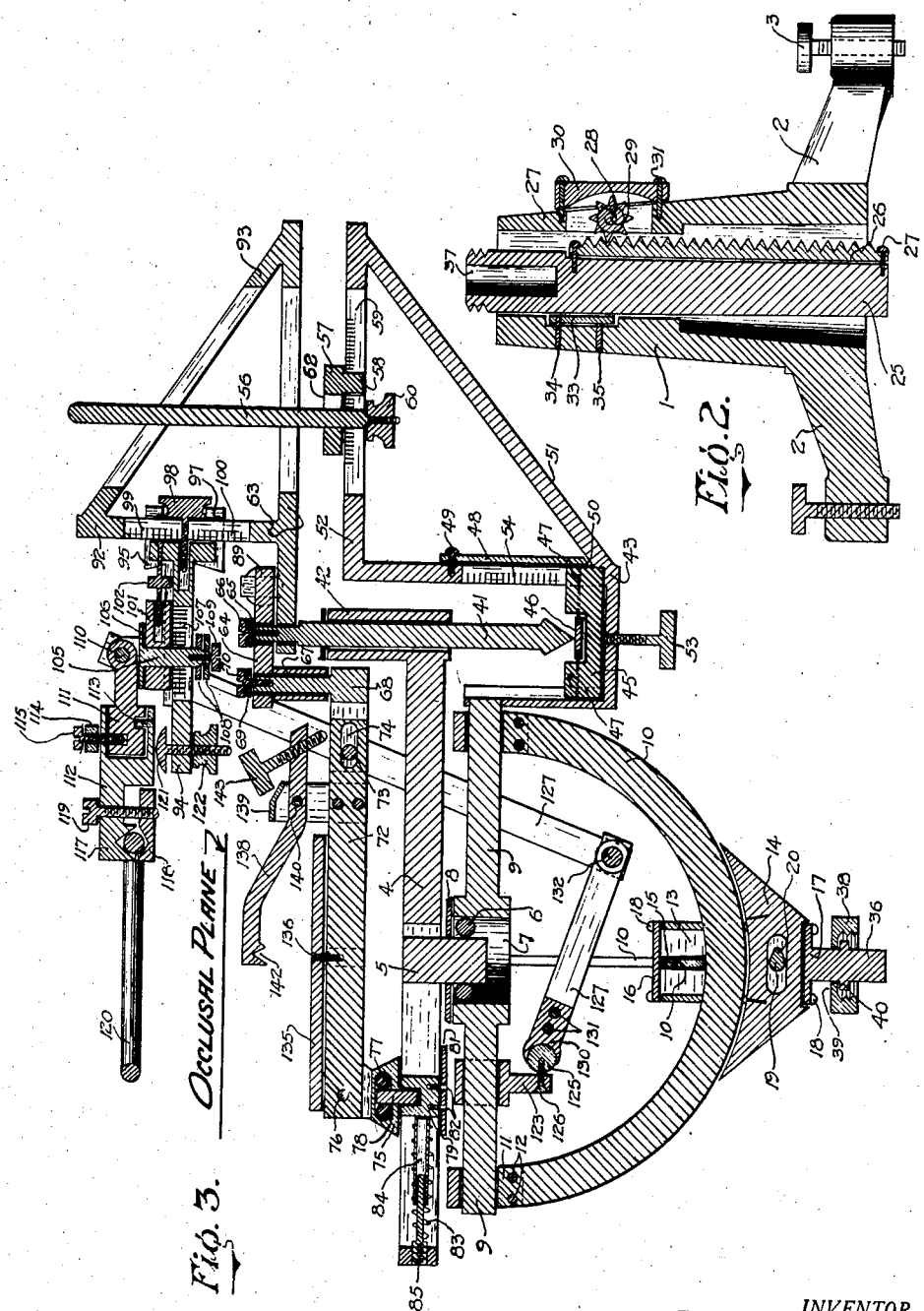
INVENTOR.
J. W. Guinn Feb. 28, 1939.  J. W. GUINN  2,148,692
ARTICULATOR
Original Filed July 15, 1933   7 Sheets-Sheet 3
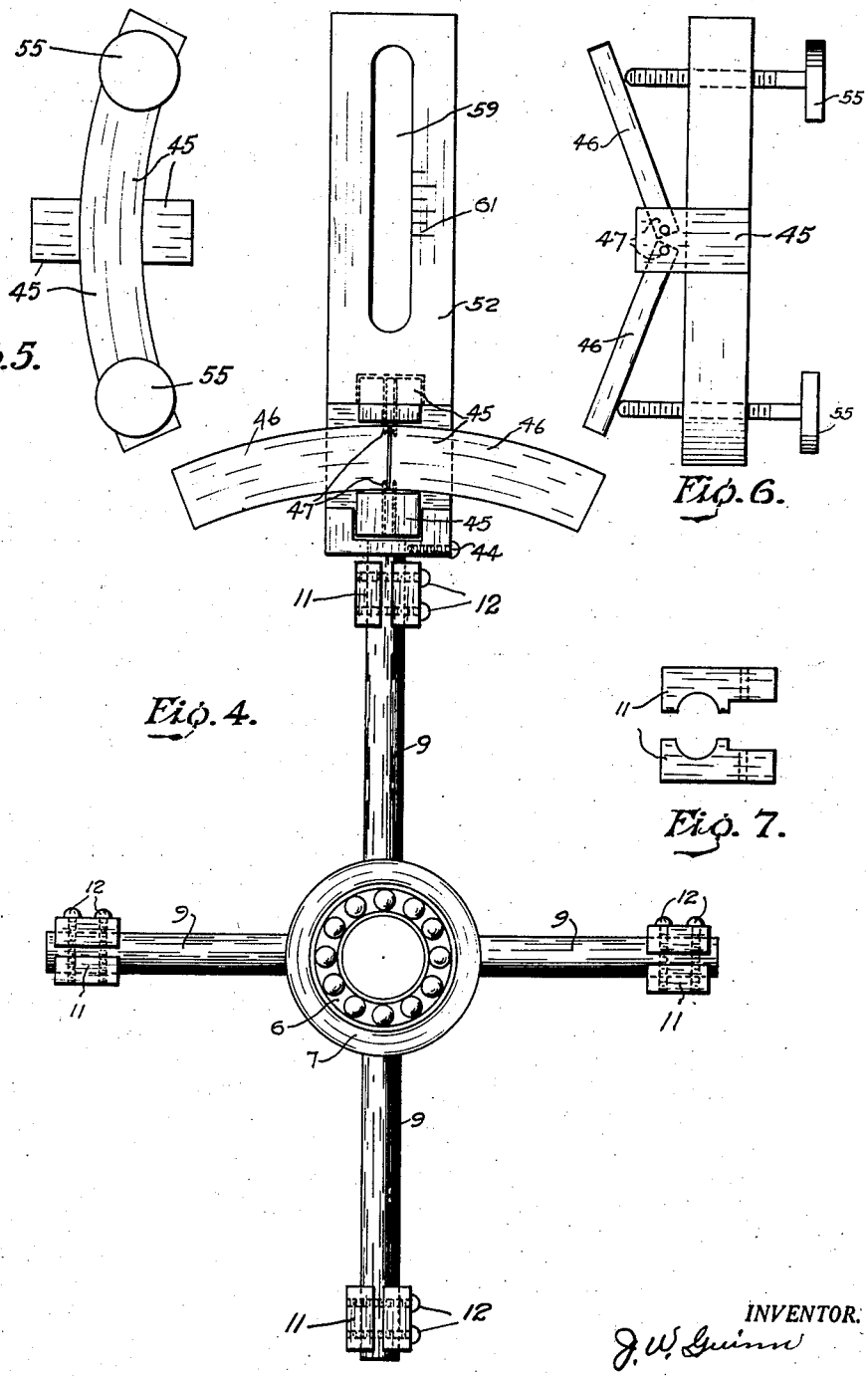
INVENTOR.
J. W. Guinn Feb. 28, 1939.  J. W. GUINN  2,148,692
ARTICULATOR
Original Filed July 15, 1933   7 Sheets-Sheet 4
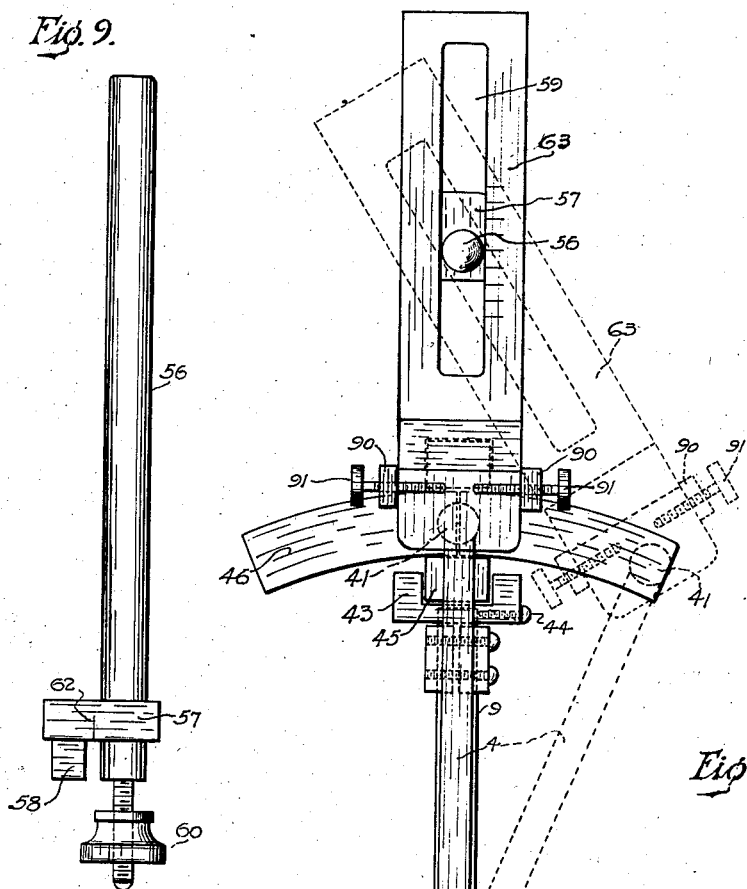
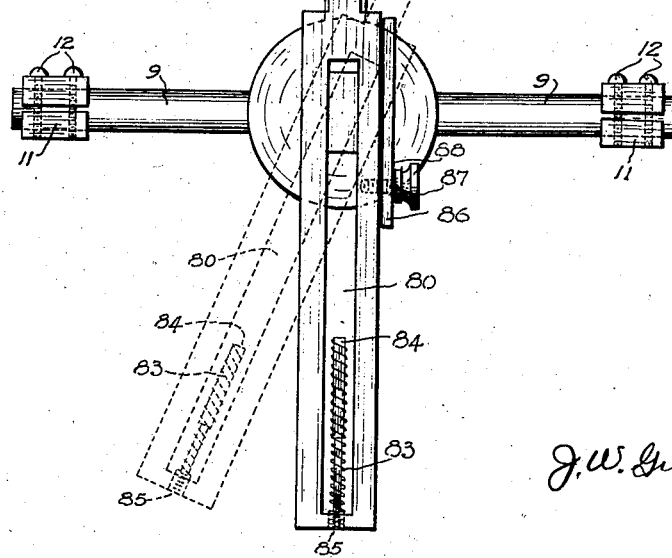
INVENTOR.
J. W. Guinn INVENTOR.
J. W. Guinn Feb. 28, 1939.                J. W. GUINN                2,148,692
                               ARTICULATOR
                   Original Filed July 15, 1933    7 Sheets-Sheet 6
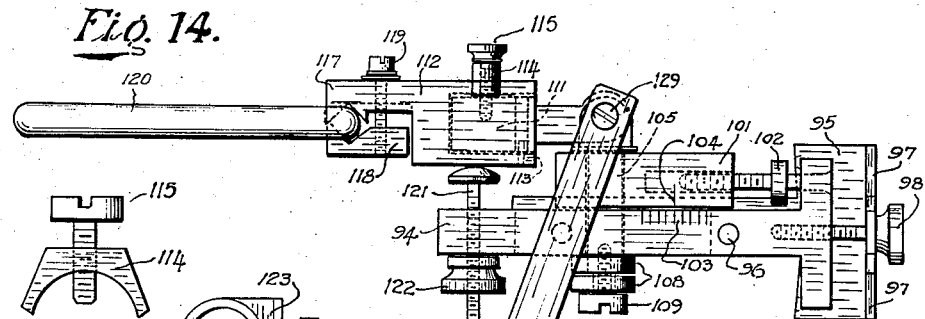
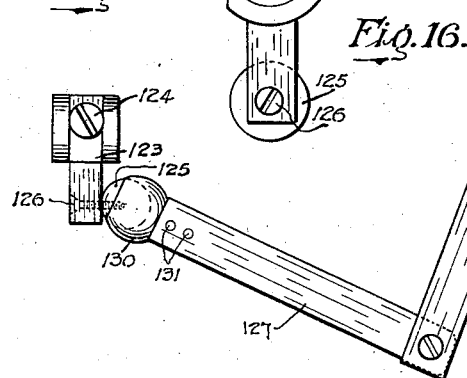
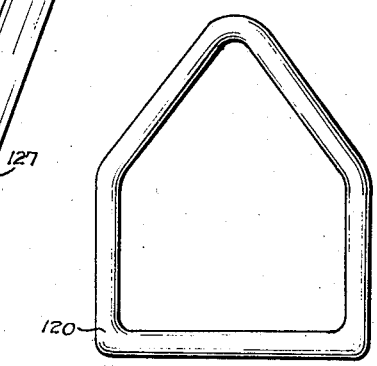
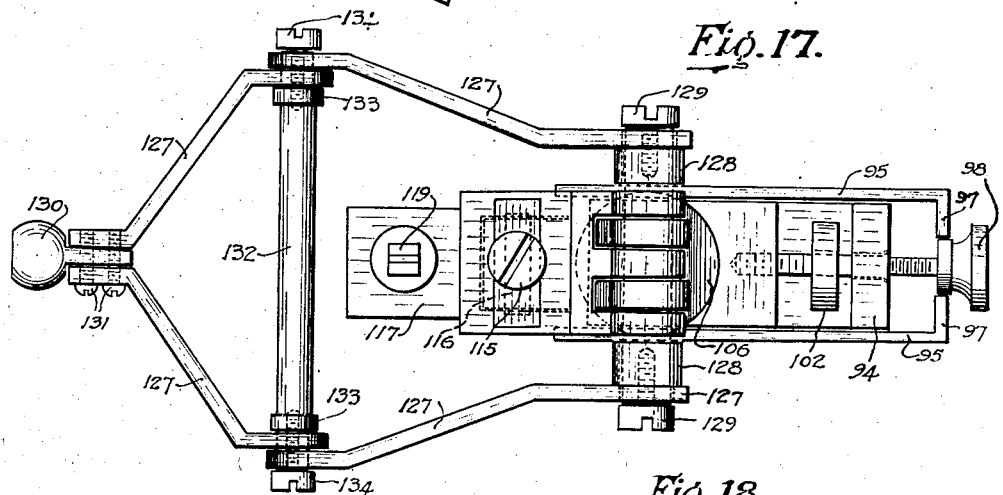
INVENTOR.
J. W. Guinn Feb. 28, 1939. J. W. GUINN 2,148,692
ARTICULATOR
Original Filed July 15, 1933 7 Sheets-Sheet 7

INVENTOR.
J. W. Guinn

Patented Feb. 28, 1939

2,148,692

UNITED STATES PATENT OFFICE 2,148,692

ARTICULATOR

James Weldon Guinn, Abilene, Tex.

Substituted for abandoned application Serial No. 680,589, July 15, 1933. This application August 30, 1938, Serial No. 227,463

11 Claims. (Cl. 32—32)

My invention relates to a machine, (hereinafter referred to as an articulator) for the use of dentists, the purpose of which will be clear to those skilled in the art; to provide means to support for manipulation upper and lower jaw casts while constructing artificial dentures.

The mandible moves in relation to the fixed maxilla on two condyles in the glenoid fossae. The fossae's formation and the condyle's formation are asymmetrical and the lateral axes of rotation are mutable in character. According to this invention it is not necessary to determine the condyle movement or the length of the mandible from the condyles to the incisor point, the resultant movements of the mandible being accomplished, from the medial center of the articulator by synchronized reciprocating movements of the maxillary and mandibular parts of the articulator.

An important object of the invention is to provide for accurate and varied adjustments of the articulator for determining the mechanical engineering necessary to construct dentures which are balanced mechanically as well as anatomically to be able to reproduce with the utmost accuracy cusp paths on occlusal surfaces of the dentures, which will coordinate with the jaw movements of the patient for whom dentures are constructed.

A further object is to provide for noting and recording all adjustments to which the articulator is set so that the same may easily be duplicated. The several features of the invention, whereby these and other objects may be attained, will be clearly understood from the following description and accompanying drawings, in which:

Figure 2 is a vertical section through the longitudinal center of the bottom part of the articulator's base.

Figure 3 is a longitudinal vertical section of the articulator and top part of base removed from Figure 2.

Figure 4 is a plan view of Figure 3 with the turn-table and mounting shaft and their connections removed.

Figure 5 is a bottom view of elevation table removed from the articulator.

Figure 6 is a rear elevation of Figure 5.

Figure 7 is a view of split collars.

Figure 8 is a plan view of Figure 3 with Figures 10 and 14 removed, showing the turn table and rear end guide part in two different positions.

Figure 9 shows side elevation of guide rod.

Figure 14 is a side elevation of maxillary part of the articulator with T shaped plate removed from bracket member.

Figure 15 is a front view of the clamping washer mounted on tubular member.

Figure 16 is a front view of the maxillary hanger and guide ball.

Figure 17 is a plan view of arc-shaped member removed from Figure 18.

Figure 18 is a plan view of Figure 14 with T plate replaced thereon.

Figure 1:
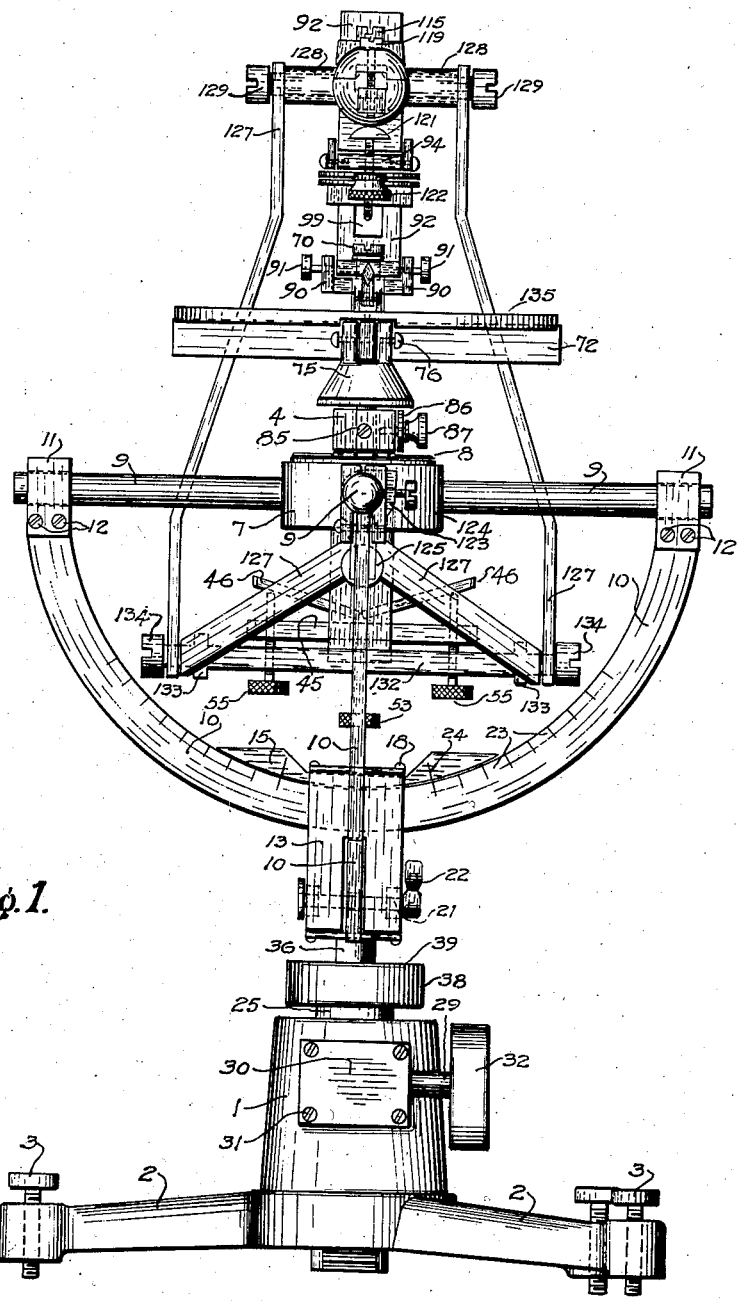
Figure 1 represents a front view of the articulator.

This application is a substitute for my former application Serial No. 680,589, filed July 15, 1933, and abandoned.

The machine shown in the drawings, and hereinafter called an articulator, comprises a relatively fixed base 1 supported by three legs 2 arranged in a triangle with thumb adjusting screws 3 in the foot of each leg for the purpose of leveling articulator on work bench.

Mounted directly above the base is a turn-table 4 for the purpose of effecting motion to parts hereinafter described. Said turn-table 4 rotates on an axle 5 extending down from near center of the table and at right angles to its surface in a bearing, which may comprise a ball-race 6 secured to the axle 5 and seated in a hub 7. There is provided a washer 8 secured to the axle 5 and rotatably contacting top surface of the hub 7 to protect ball bearing from debris, said hub 7 being held in suspension by four spokes, 9, extending therefrom in the longitudinal center, and at right angles to longitudinal center, with their extended ends pivotally connected to two arc segments 10 by split collars 11 secured to the arc segments 10 by clamping screws 12. The spokes, arc segments, split collars and clamping screws are identical in construction, and similar reference numerals have been used to indicate the corresponding parts in the drawings. Said arc segments 10 are crossed, one above the other. The outside of top arc segment is slidably in contact with the inside of bottom arc segment, as shown in this construction. The arc segments 10 are mounted on a rotating block 13, channeled from top and bottom ends, said channels intersecting in center of the block 13 to slidably support the arc segments 10 and the shoes 14 and 15 fitted to inside of top arc segment 10 and outside of bottom arc segment 10 respectively. Said shoes 14 and 15 may be secured in the channels by plates 16 and 17 fitted to shouldered recess surfaces on back of shoes 14 and 15 and secured to the top and bottom ends of block 13 by clamping screws 18. The arrangement of the parts above described allows for the universal inclination of planes of position of turn-table 4, and axis of rotation of turn-table 4, to correspond with the planes of position and axis of rotation found in each individual for whom dentures are constructed. Said turn-table 4 may be secured in any position relative to the horizontal to which it may be adjusted by lock mechanism near the bottom end of block 13, said lock mechanism comprising a levered shaft 19 with an eccentric 20 on its center rotatably secured in an aperture through the block 13 and shoe 14. Said shaft 19 may be rotatively secured in block 13 by annular bearings 21 fitted to the shaft and the aperture in the block 13, and when shaft 19 is rotated by lever 22 the eccentric 20 on shaft 19 will lift shoe 15, locking the arc segments 10 against the shoes 14 and 15. Said arc segments 10 may be provided with calibrations 23 cooperating with marks 24 on shoes 14 and 15 for indicating the degree of tilting of the planes of position and axis of rotation in the turn-table 4.

The body of base 1 forms a tube receptacle, which extends vertically, channeled on its inner surface to slidably support a shaft 25 with a rack 26 secured on its side with clamping screws 27. Near top end of the base 1 is an aperture through which said rack 26 is engaged by a pinion 28 on a shaft 29, which is rotatably supported in a bearing formed in the base 1, and the box-housing 30 is secured to outside of base 1 on a flattened surface by clamping screws 31, screw-threaded into the base 1. The purpose of said pinion 28 is to raise or lower the articulator by means of hand wheel 32 secured on shaft 29 to suit the convenience of operator; and for the purpose of stabilizing the articulator there is provided a friction shoe 33 fitted to shaft 25 and suspended inside of tubular bearing in the base 1 on a pin 34 extending through the base 1. The pressure may be regulated by set-screw 35, screw-threaded through base 1 pressure against shoe 33 and shaft 25. A journal 36 on the top end of which is formed the plate 17, secured to the bottom end of the block 13, provides a rotatable connection between the articulator and base 1. Said journal 36 is mounted in a socket 37 in the end of shaft 25 for the purpose of turning the articulator to inspect dentures under construction. Slidably fitted on journal 36, and in threaded engagement with end of shaft 25, is a lock-nut 38, flanged on its top inner surface at 39, for the purpose of clamping bearing shoulder 40 on journal 36 against the end of shaft 25.

In carrying out my improved method of constructing artificial dentures, jaw kinematics have been disregarded and synchronized, reciprocating motion of the upper and lower parts of the articulator substituted therefor. This is accomplished by means of a shaft 41, hereinafter called a transmission shaft, which is slidably and rotatably mounted in an upwardly extended perpendicular tubular bearing 42 on the rear end of turn-table 4. Transmission shaft 41 slides vertically and rotates in tubular bearing 42 and when turn-table 4 is rotated, transmits synchronized reciprocating movements and positions to the maxillary and mandibular parts, said maxillary and mandibular parts being hingedly and rotatably mounted on the upper end of said shaft 41, as hereinafter described. For the purpose of adjustably supporting transmission shaft 41 in tubular bearing 42, there is provided a downwardly extended square bottom bracket or stirrup 43, secured on the rear end of one of the spokes 9 by means of a clamping screw, screwed through a threaded aperture in said stirrup 43. The forward and rearward walls of the stirrup 43 are perpendicularly disposed and vertically channeled to adjustably support an elevation table-part therein. Said table comprises a cross bar 45 with its forward and rearward ends terminating in upwardly extending shouldered portions, through which extend parallel longitudinal apertures for the purpose of pivotally connecting laterally disposed elevation plates or wings 46 to the top surface of the cross-bar 45 by means of pivots 47 extending through said apertures, their inner ends rotatably secured in apertures in the forward and rearward sides of wings 46.

The wings 46 and cross-bar 45 forming the elevation table are arc shaped when viewed from above, with the radius of said arc taken from the center of the axle 5 on turn-table 4. The elevation table is slidably secured in the stirrup 43 and channels by means of a plate 48, secured on the rear face of the stirrup 43 by a clamping screw 49 at the top end, screw-threaded into the stirrup 43 with the lower end of plate 48 resting in a notch at 50, formed by a brace 51 extending from the bottom end of stirrup 43 to the rear end of a horizontal bar portion 52, said brace rearwardly extended from top of stirrup 43.

Directly under the vertical center of the elevation table is a thumb adjusting screw 53, screwed through a threaded aperture in bottom of stirrup 43 for the purpose of raising and lowering said table in the stirrup. The side of the stirrup 43 may be provided with calibrations at 54 cooperating with surface of table for indicating the elevation of said table part. Near the ends of the laterally extended portion of cross-bar 45 are thumb-adjusting screws 55, screwed through threaded apertures in the cross-bar 45 for the purpose of elevating the laterally extended ends of wings 46. The elevation table parts form a sliding track and vertical guide upon which the cone shaped end of the transmission shaft 41 rests. Said arrangement is for the purpose of conforming the maxillary and mandibular part of articulator connected to said shaft 41, and hereinafter described, to the planes and positions found to exist in the mandible and maxilla of edentulous patients.

The rearwardly extended horizontal portion, or bar 52 of the stirrup 43, is slotted in the vertical longitudinal center and forms a mounting base for a guide rod 56. Said rod is adapted to be adjusted longitudinally on the bar. To provide for this the rod 56 has a plate 57 secured thereon for contact with the top surface of bar 52, a lug 58 on the plate 57 extending into the slot 59 in bar 52 to prevent rotation of rod 56 thereon. The guide rod may be secured in adjusted positions by a knurled clamping nut 60, screw-threaded on the end of said rod 56, and contacting the bottom surface of bar 52. Bar 52 may be provided with calibrations, 61 (as shown in Fig. 4) cooperating with mark 62 on plate 57, for indicating the longitudinal position of guide rod.

Figure 10:
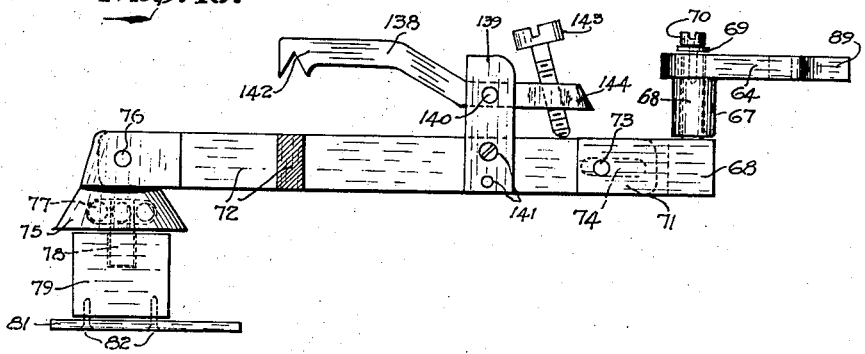
Figure 10 is a side elevation of the mandibular part of the articulator with the surface plate removed.
Figure 11:
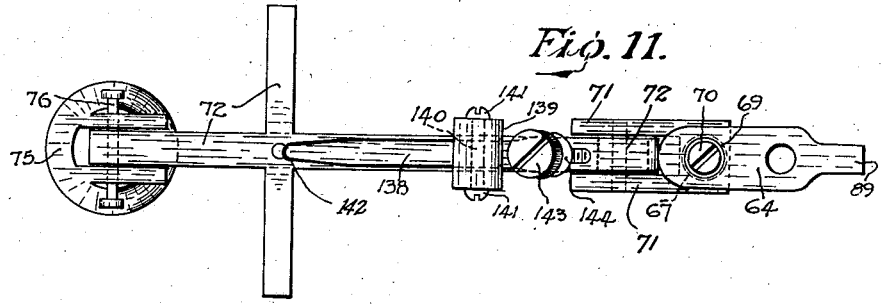
Figure 11 is a plan view of Figure 10.
Figure 12:
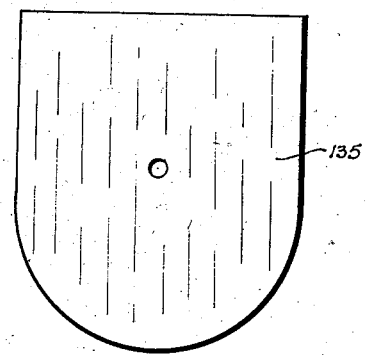
Figure 12 is a plan view of surface plate removed from Figures 10 and 11.
Figure 13:
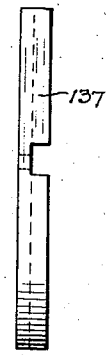
Figure 13 is a side view of Figure 12.
Figures 19, 20:
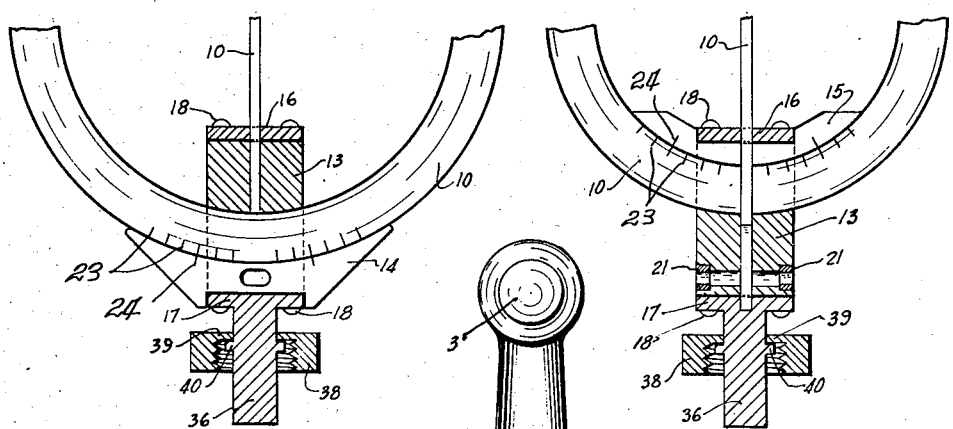
Figures 19 and 20 show side and front views of a segment of the base with certain parts being shown in vertical section showing arrangement of the arc segments and shoes.
Figure 21:
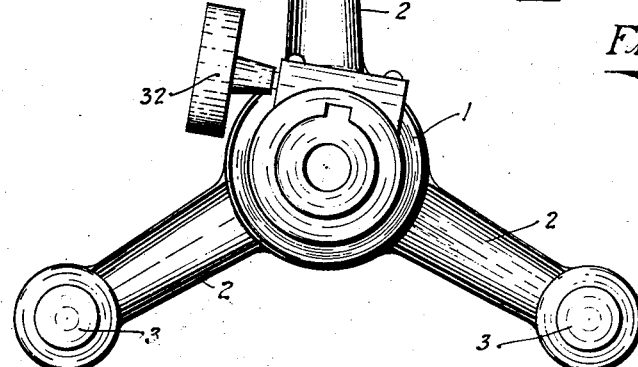
Figure 21 is a plan view of the bottom part of the base.
Figure 23:
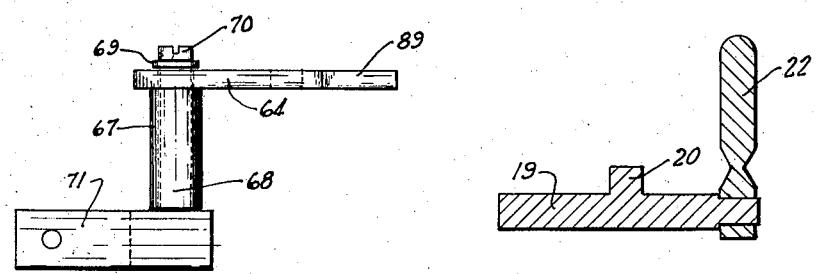
Figure 23 is a sectional view of a levered shaft with an eccentric for securing arc segments shown in Figures 19 and 20.
Figure 22:
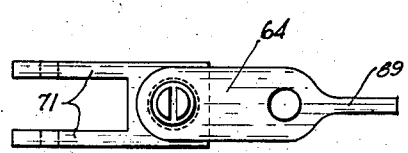
Figure 22 shows a plan and side view of the mandible hanger.

Mounted upon the upper extended portion of transmission shaft 41 are the mounting and lateral guide elements to support the rear ends of maxillary and mandibular parts. Said elements may comprise a rearwardly extended bar 63, secured to the transmission shaft 41, and a forwardly extended bar 64, rotatably mounted on top surface of above mentioned bar 63, on a reduced shank portion of the transmission shaft 41. Said bar 64 may be secured thereon by a washer 65 and retaining screw 66, screw-threaded in an aperture in the end of transmission shaft 41. The forwardly extended portion of bar 64 terminates in a downwardly extended tubular bearing 67 to rotatably support a hanger with a shaft 68 (as shown in Figs. 3, 10 and 11), hereinafter called the mandible shaft 68, rotatably secured in said bearing by a washer 69 and a retaining-screw 70, screw-threaded in an aperture in the top end of the mandible shaft 68. The mandible shaft 68 terminates downwardly in a jaw portion 71, forwardly extended, and at right angles to shaft portion; said hanger telescopes, and pivotally connects the rear end of a cross bar 72 to the hanger by means of hinge pin 73 through an aperture in jaw 71 of hanger and a slot 74 through the cross bar 72, hereinafter called the mandible bar 72.

The forward portion of turn-table 4 is vertically slotted in longitudinal center for the purpose of forming a mounting base and guide for the forward end of the mandible bar 72 by means of a block 75, hereinafter called the mandible block, hingedly connected to the forward end of mandible bar 72 by a hinge pin 76 in an aperture through the mandible block 75 and bar 72. Said mandible block may be slidably and rotatably connected to turn table 4 by means of a ball-race 77 secured in a socket in the bottom surface of the mandible block 75. The ball race 77 has a downwardly projecting pin 78 secured to a guide piece 79, which is slidably retained in the slot 80 through the turn-table by means of a slide plate 81 secured to the bottom surface of the guide piece 79 with clamping screws 82, screw-threaded into the guide piece 79, the plate 81 slidably contacting the bottom surface of turn table 4. Said arrangement permits the forward end of mandible bar 72 to both slide and rotate in respect to the turn table 4 and makes it possible to conform the articulator's rotation and position with the horizontal position and rotation of the mandible in the various movements of mastication.

In order to hold the mandibular parts against forward displacements on turn-table 4, I prefer a spiral spring 83, exerting sufficient pressure between the inner ends of turn-table 4 and guide piece 79. Said spring 83 may be mounted in the slot 80 on a tube 84 and pin 85. The forward end of the pin 85 is enlarged and screw-threaded in an aperture through the end of turn-table 4, extending rearwardly a distance to slidably support the tube 84 and spring 83 formed thereon. The rear end of the tube 84 is shouldered, forming a seat for the spring 83, which will bear against the guide piece 79 and turn-table 4, forcing the entire mandible support to slide rearwardly when turn-table 4 is rotated. This arrangement is for the purpose of reproducing a patient's retrusive positions from centric to lateral occlusion, said positions to be determined from each individual's bite, properly marked from bite-plates while in their mouths in above stated positions. Should the patient's bite-plates show a protrusive movement, the mandible bar 72 and front end mountings may be secured against retrusive movement on turn-table 4 by means of a stop-plate 86, the forward end of which has a flanged finger piece extending under turn-table 4 to hold the mandible bar 72 against retrusive movement by contacting slide-plate 81 on bottom surface of the turn-table 4. Said stop-plate 86 is adjustably secured to side of turn-table 4 by a locking screw 87, passing through a slot 88 in the stop-plate 86, and screw-threaded into the side of turn-table 4.

It will be apparent that should a patient's lateral longitudinal position of the mandible to the maxilla be anywhere between retrusive and protrusive from a centric position to lateral position then by the correct positioning of stop-plate 86, their identical positions may be reproduced. The mandible shaft 68 may be positioned laterally in relation to the median center of articular. This is accomplished by rotating the forwardly extending mounting bar 64 on transmission shaft 41, and, for this purpose, said bar has a rearwardly extended spline portion 89, terminating between two upwardly extended ears 90 formed or secured on the sides of the rearwardly extended mounting bar 63 to receive the laterally disposed thumb adjusting screws 91, screwed inwardly through threaded apertures in the ears 90 to engage the spline 89. Such arrangement allows for accurately reproducing an asymmetrical jaw center in the articulator, corresponding to asymmetrical jaw centers that are found to exist in edentulous patients.

The rearwardly extending mounting bar 63 has a perpendicularly extended portion or bar 92 with a brace 93 extending from its upper termination to rear end of horizontal portion of 63. Said rearward extension of bar 63 and the brace 93 are slotted in the vertical longitudinal center to slidably receive guide rod 56. The perpendicular bar 92 has mounted thereon a horizontally forwardly extending T-shaped bracket member 94, vertically slotted in the longitudinal center, which member may be slidably secured to perpendicular bar 92 by means of T-plates 95 secured to sides of bracket member 94 by clamping screws 96, screw-threaded into the bracket member 94. Said plates terminate rearwardly with inwardly turned lips or flanges 97 contacting the back surface of perpendicular bar 92.

Said arrangement forms a retaining guideway and allows for the vertical adjustment of the bracket member 94, which may be secured in adjusted position by a thumb-adjusting screw 98 passing through a vertical slot 99 in the perpendicular bar 92, and screw-threaded into the end of the bracket member 94, said screw having a shouldered surface for contacting the perpendicular bar 92 between the flanges 97 on the T-plates 95. The perpendicular bar 92 may be provided with calibrations at 100, cooperating with surface of bracket member 94, for indicating the vertical position of said member. The T-plates 95 extend upward a distance on the sides of bracket member 94 to form a track for the rearward and forward adjustment of a block 101 mounted thereon by means of a two-way adjusting screw 102, the rear end of which may be rotatably secured in an aperture through the rear end of T-shaped bracket member 94, the forward end of the screw 102 being screw-threaded in an aperture in the rear end of said block 101. The sides of T-plates 95 may be provided with calibrations 103, cooperating with mark 104 on block 101, for indicating the longitudinal position. The shaft, hereinafter called the maxillary shaft 105, is connected to the mandible shaft 68 as will hereinafter be described in detail.

The bracket member 94 and the block 101 mounted on said bracket member 94, and the parts connected thereto by means of a rotating hinge joint, and hereinafter described, comprise the maxillary part of articulator. Said hinge connection may comprise the maxillary shaft 105, rotating in a perpendicular aperture extending through the block 101; the upper portion of the maxillary shaft 105 has a shouldered bearing surface 106, rotatably contacting the top surface of the block 101, while the lower extending portion passes through block 101 and the slot 107, through the bracket member 94, and is secured thereto by means of washers 108, rotatably and slidably contacting the bottom surface of bracket member 94. The washers may be secured on maxillary shaft 105 by a clamping screw 109, screw-threaded in an aperture in the end of said shaft 105.

Hingedly connected to the upper extended portion of maxillary shaft 105 by means of a hinge pin 110 is a forwardly extended shaft or journal 111, and rotatably mounted upon said journal 111 is a tubular member 112, which may be retained thereon by means of a key 113, extending through an aperture in the wall of tubular member 112 with the inner end of the key 113 projecting into a grooved surface on journal 111. Said tubular member 112 may be secured against rotating on journal 111 by means of a washer 114 mounted on top surface of the tubular member 112. The washer has an aperture through which rotatably passes a thumb adjusting screw 115. The shouldered head of screw 115 contacts the top surface of washer 114, while the lower extended portion of said screw slidably extends through a transverse slot 116 in the tubular member 112 and is screwed into a threaded aperture in the journal 111. Said tubular member 112 may be secured in adjusted positions against the washer 114 and journal 111. The axial rotation of the tubular member 112 on journal 111 is for the purpose of reproducing asymmetrical vertical relations in the articulator, corresponding to asymmetrical vertical relations found to exist in edentulous patients between the mandible and maxilla.

The forward portion of tubular member 112 is provided with two jaws. The upper jaw 117 is fixed and the lower jaw 118 is suspended by means of a clamping screw, rotatably passing through an aperture in the fixed portion with its lower extended portion screw-threaded into the lower jaw 118, the purpose of which is to secure a forwardly extended polygon-shaped member 120 between the two clamping jaws 117 and 118 in transverse, V-shaped channels formed in both jaws.

The polygon-shaped member 120 is for the purpose of attaching the upper jaw model to the articulator by means of plaster of Paris, or any other adhesive material. It is not necessary that said polygon-shaped member 120 conform to any particular design, providing said member can be laterally adjusted and vertically tilted and held secure by clamping jaws 117 and 118.

The rest position of the tubular member 112 is horizontal, but it may be adjustably angled up or down from its hinged connection at 110, to correspond with the sagittal horizontal plane that is found to exist between the mandible and maxilla in an edentulous patient, by means of an adjusting screw 121, screwed through a threaded aperture in the forward portion of bracket member 94. The upper end of the screw is oval shaped and contacts the under surface of the tubular member 112, and to secure the screw 121 against accidental movement there is provided a knurled thumb-nut 122, screw-threaded on lower extended portion of adjusting screw 121, for contact with bottom surface of bracket member 94.

To assist in guiding the maxillary support in relation to mandible support there is provided a ball and socket guide mounted on the forwardly extended spoke 9 by means of a hanger 123, laterally and longitudinally adjustable on said spoke 9, to which it may be secured in adjusted positions by a thumb adjusting screw 124 (see Fig 1), screwed through a threaded aperture in the side of hanger 123. The ball 125 portion of the guide is secured to a downwardly extended portion of the hanger by means of a clamping screw 126, screw threaded into an aperture in the ball 125. Said guide ball may be connected to the maxillary shaft 105 by means of laterally disposed guide straps 127, rotatably mounted on the laterally extended ends of hinge pin 110, which extends laterally through elongated tubular apertures 128 secured or formed on the ends of straps 127. The inner ends of tubular apertures 128 contact the outer face of the hinge joint formed by maxillary shaft 105 and journal 111. Said straps may be rotatably secured thereon by retaining screw 129, screwed into a threaded aperture in the ends of hinge pin 110. Said straps extend downwardly, outwardly, and forwardly to near the center of the space formed by arc segments 10 and rear spoke 9 to form a pivotal connection with the forward portion of straps 127, which converge inwardly, to be secured to the socket portion of ball guide 130 by clamping screws 131. The pivotal connection above referred to is formed by means of a spreader rod 132, the ends of which have a shouldered shank portion 133, rotatably secured in tubular apertures in the ends of the guide straps 127 by retaining screws 134, screwed into threaded apertures in the ends of the spreader rod 132. The above described guide straps are identical in construction and similar reference numerals have been used to indicate the corresponding parts in the drawings.

The lower jaw model is mounted on a surface plate 135, secured to the mandible bar 72 by means of a clamping screw 136, screw-threaded into mandible bar 72. The aperture through surface plate is countersunk so that the head of screw 136 will be flush with surface of plate 135. The bottom of surface plate has a flange or lip portion 137, extending downwardly and notched to fit the mandible bar 72 to prevent accidental rotation thereon.

The model of the mandible may be secured to the surface plate 135 by means of a dog 138, pivotally mounted at the rear end of said plate in an inverted U-strap 139 on a pin 140 that extends through an aperture in the U-strap 139 and dog 138. Said U-strap straddles the mandible bar 72 and is secured thereon by means of clamping screws 141. The forward portion of dog 138 is arc-shaped, terminating in a downwardly, saw-toothed, knife-edge projection 142 to engage the lower jaw model between the ridges and may be secured therein by means of a thumb-adjusting screw 143, screw-threaded through a flattened boss-shaped horizontal projecting rear portion 144 of the dog 138, the bottom end of thumb adjusting screw contacting the top surface of mandible bar 72.

*Recapitulation*

A comprehensive recapitulation of the above described invention comprises an articulator with a base having three parts, fixed, adjustable and functional. The fixed part is the body of base 1 and its supporting legs 2. The adjustable part is the hub-bearing 7, elevation table, comprising cross bar 45 elevation wings 46 and the supporting arc segments 10 connected to the fixed part of base by means of spokes 9 and rotating block 13. The functional part comprises the turn table 4 and transmission shaft 41 upon which is mounted the lower jaw model holder or mandible part, and an upper jaw model holder or maxillary part, each part being independently mounted upon perpendicularly disposed rotating shafts at their rear end, the mandible shaft 68 being laterally adjustable and the maxillary shaft 105 being forwardly and rearwardly adjustable in relation to each other, and the transmission shaft 41, both maxillary and mandibular parts, being guided by a fixed and a movable part. The fixed part comprises a horizontal rearwardly extended part or bar 52 with a perpendicular guide rod 56, longitudinally and adjustably secured thereon. The movable part comprises a swinging, rotating, sliding part or bar 63 upon which the maxillary and mandibular parts of the articulator are mounted, connected to the fixed guide bar, and guided laterally by the guide rod 56 slidably passing through the vertical slot in the movable bar 63.

The purpose of an articulator other than reproducing jaws movement is to be able to determine by its use the proper place to build the occlusal surface to control the forces of mastication (compression, torque and shear).

A résumé of a case constructed according to this invention follows:

Cast upper and lower models from accurate impressions and uniformally trim, or otherwise make one inch thick through incisor point to back surface of the models and one inch thick through the most distal point of the models that are to be covered by teeth. This preparation is essential in correlation of anatomical and mechanical engineering, as in my invention the models are classified mechanically as the foundations upon which the dentures are constructed It is imperative that they be of equal mechanical value in the use of reciprocating motions and positions produced from the medial center instead of the right and left lateral axis from which actual mandibular motions emanate. We then obtain the bite in centric occlusion, using any technique that is practical and accurate, marking upon the bite, while in the patient's mouth the medial center (the incisor point) and the exact height that the incisal edge of the lower six anterior teeth should occupy in the finished denture. Remove the bite, place the jaw models in the bite, while resting on a level surface, and by means of a tri-square make a vertical mark on upper and lower jaw models, said mark passing through the incisor point marked on the bite. Remove the upper model and bite, extend the mark over the ridge of the lower model rearwardly, equi-distant between the ridges. Place the lower jaw model on the lower jaw model holder of the articulator, with the center of the jaw model in the center of the articulator and the incisor point of the model directly over the incisal axis 78 of rotation of the mandibular incisal guide and secure the model thereon by dog 138 and screw 143. Place the bite on the lower jaw model and the upper model in the bite, place a spirit level on the back surface of the upper jaw model and release arc segments locking mechanism with lever 22. Adjust arc segments 10, 10 until the back surface of upper jaw model is level in all directions. Secure arc segments 10 and 10 in their adjusted positions by lever 22, release clamping screws 115 and 98 of the upper jaw model holder and adjust the bar 94 vertically and the member 120 axially until said member 120 contacts the back surface of the upper jaw model, secure the member 120 and bar 94 in their adjusted positions by their respective clamping screws 115 and 98; attach member 120 to the back surface of upper jaw model with plaster of Paris, release clamping nut 122, adjust screw 121 vertically until its top surface contacts the under surface of tubular member 112 and secure screw 121 to its adjusted position by clamping nut 122. Let us assume that the adjusted readings on the arc segments are 10° longitudinally forward and 1° transversally to the right, and that after removing the bite the vertical opening at the incisor point is 17 mm. between the jaw models.

Teeth of the proper color, size, and length that can be set high on the ridges of the jaw models to eliminate as much individual tooth leverage as possible and be articulated are selected. Set the lower six anterior teeth first on a base plate properly formed, then the six upper anterior teeth to properly articulate with the lower teeth, the exact vertical position that the incisal edge of the lower teeth holds to the upper teeth being determined by the marks on the bite. Set the lower posterior teeth, using a spirit level to set them, level from side to side with the curve of Spee, extending from cuspid to distal occlusal edge of the second molar. The test for accuracy should show level from right cuspid to distal occlusal surface of left second molar and vice versa. Finish setting the upper teeth, articulating them with the lower teeth and finish the wax bases to properly restore facial contour. Release lock nut 122 and lower screw 121 which allows reciprocating vertical motion at 110 and 73 of the upper and lower jaw model holders. Adjust table 45 vertically by screw 53 while carefully watching for longitudinal cuspal interference, which can be corrected by rotating or changing the perpendicular axis of a tooth, and at the same time correct the over-bite and overjut until all teeth are in incisal, and cuspal contact with each other. Assume that the table 45 and mountings were lifted $\frac{7}{32}$ of an inch in producing above relations; we lower table 45 to original starting point, and adjust vertically the elevation wings 46 on table 45 with screws 55 until the jaw model mounts are lifted $\frac{7}{32}$ of an inch. When table 4 is rotated laterally, correct any interference that may be shown from centric to lateral positions. Remove the dentures from the models at this time and try in the patient's mouth to verify the correctness of the articulation and esthetic appearance in the patient's mouth. Make any changes desired at this time that will not change the elevation of the occlusal surface of the lower denture. Dismiss patient and finish the dentures in any of the base materials desired.

At a subsequent sitting place the finished dentures in the patient's mouth, with soft wax (carding wax) on the occlusal surface of the lower denture and have the patient close mouth in centric occlusion on the wax until the occlusal surfaces are in contact. Remove the dentures from the patient's mouth and remount them in the articulator on the same models or duplicate models, using the finished dentures as the corrected bite in centric occlusion. Set articulator to the exact positions it occupied in centric occlusion when setting the teeth up. Remove the soft wax from the occlusal surfaces and by the use of the spirit level check the lower denture's occlusal surface, and if in the finishing of the denture any tooth has changed its vertical elevation from the original set up, it should be lowered by the use of stones, being careful not to destroy the anatomy of the tooth. Coat the occlusal surfaces with an abrasive such as emory dust, rotate table 4 laterally right and left with the teeth in light contact until there is no cuspal interference from centric to lateral occlusion. During this grinding adjust maxillary axis 105 forward and rearward in relation to mandibular axis 68, the maxillary incisal ball and socket guide 123 forward and rearward to the mandibular incisal guide axis 78. The finish is accomplished with axes 105 and 68 at rear end in vertical relation and the axis 78 and ball and socket 123 in vertical relation at front end. Stop plate 86 at this time is loosened, allowing the lower incisal guide to slide rearwardly when table 4 is rotated, and with the dentures in centric occlusion. Release adjusting screws 91 sufficiently to allow the rear end of the lower denture to swing laterally, release clamping screw 115 allowing upper denture to rotate axially transverse to the longitudinal, hold the dentures together in centric occlusion with slight pressure and swing the rear end of lower jaw model holder laterally right and left until the upper denture is firmly seated. Remove the dentures from the articulator, clean and place in the patient's mouth. They will be freed of all cuspal interference in any and all masticatory movements.

It will now be apparent that I have designed a new and useful construction which embodies all the features of advantage enumerated as desirable in producing jaw movements, while at the same time embodying features and advantages for determining and building engineering in dentures to control the forces of mastication. I have in the present instance shown and described the preferred embodiment thereof which has been found in practice to give satisfactory and reliable results. It is to be understood that the same is susceptible of modification in various particulars without departing from the spirit or scope of the invention or sacrificing any of its advantages.

What I claim is:

1. In an articulator, an upper jaw model holder, a lower jaw model holder, a shaft, a rotatable part, a base and a track element at the rear end of said base, said track element extending transversely with respect to said base and being vertically adjustable and adapted to vary the vertical elevation of said upper jaw model holder and the angular position of said lower jaw model holder in relation to a plane of occlusion defined by said articulator, said jaw model holders being mounted on said track element by means of linkage connecting said jaw model holders to said shaft, said connecting linkage comprising adjustable elements positioned above and below said plane of occlusion, said shaft being supported on said track element by a tubular bearing on said rotatable part, said rotatable part permitting lateral movement of said jaw model holders relatively to said base, and said track element being adjustable universally with respect to said plane of occlusion.

2. In an articulator, an upper jaw model holder, a lower jaw model holder, a shaft, a rotatable part, a base, and a track element at the rear end of said base, said rotatable part being positioned between said base and said jaw model holders and extending lengthwise relative to said jaw model holders, said rotatable part being adjustable universally relative to said base and adapted to move and guide said jaw model holders on said track element in relation to a plane of occlusion defined by said articulator, said jaw model holders being mounted on said track element by means of connecting linkage connecting said jaw model holders to said shaft, said track element extending transversely with respect to said base and being vertically adjustable and adapted to vary the vertical elevation of said upper jaw model holder and the angular position of said lower jaw model holder in relation to a plane of occlusion defined by said articulator, said jaw model holders being connected to said rotatable part and said base at the front end of said base by means of connecting linkage connecting one of said jaw model holders to said rotatable part and the other jaw model holder to an element on said base, said connecting linkage at the rear end and front end of said base comprising adjustable elements for positioning said jaw model holders laterally, vertically and lengthwise relative to each other and said base.

3. In an articulator, an upper jaw model holder, a lower jaw model holder, a shaft, a rotatable part, a base and a track element at the rear end of said base, said track element extending transversely with respect to said base and being vertically adjustable and adapted to vary the vertical elevation of said upper jaw model holder and the angular position of said lower jaw model holder in relation to a plane of occlusion defined by said articulator, said jaw model holders being mounted on said track element by means of linkage connecting said jaw model holders to said shaft, said rotatable part being mounted on said base by means of a bearing positioned in the vertical center of said base, said rotatable part being adapted to move and support said jaw model holders on said track element, said base, comprising a tubular body adjustably supported by three legs, a shaft adjustably mounted on said tubular body, said bearing being mounted on said shaft by means of adjustable connections comprising two arc segments, crossed at right angles to each other and adjustably supporting said bearing by means of four spokes extending from said bearing, split collars pivotally connecting said arc segments and said spokes, said arc segments being adjustably mounted on said shaft by means of an element comprising supporting mechanism forming a track for said arc segments permitting universal adjustment of said bearing relative to said base, said supporting mechanism comprising a locking device for securing said bearing in any adjusted position with respect to a plane of occlusion defined by said articulator, said arc segments and said supporting mechanism having suitable calibrations for determining the exact angulation of said bearing with respect to said plane of occlusion.

4. The invention according to claim 1, wherein further, said upper and lower jaw model holders comprise connecting linkage, connecting said jaw model holders to said base and said rotatable part at the front end of said base, said connecting linkage comprising adjustable elements for positioning the front end of said jaw model holders laterally and lengthwise relative to the medial center of said base, forward, rearward and laterally relative to each other, said connecting linkage forming independent incisor guides for jaw model holders, said connecting linkage and said rotatable part permitting independent lateral and vertical movement, and guidance of said jaw model holders on said track relative to each other and the medial center of said base.

5. The invention according to claim 1, wherein further, said connecting linkage connecting said jaw model holders to said shaft at the rear end of said jaw model holders, provide separate and independent inter-condyle axes for the movement of said jaw model holders on said track element, said inter-condyle axes being adjustable vertically, laterally and lengthwise relative to said base, forward, rearward and laterally relative to each other, and vertically with respect to a plane of occlusion defined by said articulator, said inter-condyle axes and said rotatable part permitting independent lateral and vertical movement and guidance of said jaw model holders on said track element relative to each other and the medial center of said base.

6. The invention according to claim 1, wherein further, said connecting linkage, connecting said jaw model holders to said base and said rotatable part at the front end of said jaw model holders, provide separate and independent incisor guides for said jaw model holders, said incisor guides being adjustable laterally and lengthwise relative to said base, forward and rearward relative to each other permitting independent incisor movement and guidance of said jaw model holders relative to each other and the medial center of said base, said incisor guides co-acting with said connecting linkage connecting the rear end of said jaw model holders to said shaft, said connecting linkage forming independent inter-condyle axes supporting said jaw model holders on said track elements, said rotatable part and said co-acting connecting linkage permitting lateral and vertical movement of said jaw model holders on said track element relative to each other and said base, said co-acting movement corresponding to the vertical and lateral movement of the mandible relative to the maxilla.

7. The invention according to claim 1, wherein further, said linkage connecting said jaw model holders to said shaft comprises a series of elements disposed vertically, forward and rearward relative to said shaft, wherein said elements provide adjustable supports and guides for said jaw model holders and said connecting linkage connecting said jaw model holders to said shaft, said connecting linkage being positioned above and below the plane of occlusion defined by said articulator, said shaft and said jaw model holders being supported on said track element by a tubular bearing on said rotatable part, said connecting linkage and said rotatable part permitting lateral and vertical movement of said jaw model holders relative to said base, and a plane of occlusion defined by said articulator, said rotatable part, said shaft, and said connecting linkage being adjustable universally on said base with respect to said plane of occlusion defined by said articulator.

8. The invention according to claim 1, wherein further, one of said jaw model holders comprises a jaw model element, to which a jaw model may be attached, a two jawed bushing supporting said jaw model element in adjustable positions relative to said base, a journal upon which said bushing is mounted permitting axial rotation of said jaw model element relative to said base, connecting linkage comprising a linkblock, connecting said journal to said shaft and comprising supporting elements adjustable and adapted to support said jaw model element with respect to a plane of occlusion defined by said articulator, said connecting linkage comprising adjustable elements for guiding the front end of said jaw model element, a ball and socket adjustably connected to an element at the front end of said base, said ball and socket being adjustable lengthwise on said base, and laterally relative to the medial center of said base, yielding elements connecting said ball and socket to said rear end of the connecting linkage connecting said jaw model holder to said shaft, said yielding elements permitting the lateral and angular adjustment and movement of said jaw model holder on said track element relative to said base.

9. The invention according to claim 1, wherein further, said base has a bearing positioned in its vertical center, a rotatable part mounted on said bearing, two arc segments crossed at right angles to each other adjustably supporting said bearing, said bearing comprising four spokes, one spoke extending forward, one spoke rearward and one spoke laterally from either side of said bearing, split collars connecting said spokes and said arc segments, said split collar connections permitting universal adjustment of said bearing relative to said base, said arc segments being supported on said base by means of supporting and locking mechanism for maintaining said rotatable part mounted on said bearing in any universally adjusted position relative to said base, said arc segment and said supporting mechanism comprising suitable calibrations to determine the exact angulation of said rotatable part with respect to a plane of occlusion defined by said articulator.

10. The invention according to claim 1, wherein further, said jaw model holders are provided with connecting linkage positioned at the front end of said base to provide independent co-acting incisor guides for said jaw model holders, and with connecting linkage positioned at the rear end of said base to provide independent coacting inter-condyle axes for said jaw model holders, said connecting linkage at the front and rear end being provided with linkblocks, comprising adjustable elements for lengthening or shortening the distance between the linkage connecting the front end of said jaw model holders to said base and the linkage connecting the rear end of said jaw model holders to said shaft, to permit predetermined lateral and vertical angular movement of said jaw model holders on said track element relative to each other and said base.

11. The invention according to claim 1, wherein further, said base comprises a bearing adjustably supported in the vertical center of said base, a rotatable part mounted on said bearing, an adjustable track element positioned at the rear end of said base, a shaft supported on said track element by means of a tubular bearing on said rotatable part, a guide element extending rearwardly from said track element, a vertically extended guide rod adjustably mounted on said guide element, said guide rod being adjustable forward and rearward relative to said track element, a co-acting guide element extending rearwardly from said shaft, slidably connected with said guide rod, said co-acting guide element permitting lateral and vertical movement and guidance of said jaw model holders on said track element relative to said base.

JAMES WELDON GUINN.